(12) United States Patent
Liang

(10) Patent No.: US 10,684,699 B2
(45) Date of Patent: Jun. 16, 2020

(54) ILLUMINATING KEYBOARD

(71) Applicants: LITE-ON ELECTRONICS (GUANGZHOU) LIMITED, Guangzhou (CN); Lite-On Technology Corporation, Taipei (TW)

(72) Inventor: Hsin-Chih Liang, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/446,647

(22) Filed: Jun. 20, 2019

(65) Prior Publication Data

US 2020/0042102 A1 Feb. 6, 2020

Related U.S. Application Data

(60) Provisional application No. 62/712,993, filed on Aug. 1, 2018.

(30) Foreign Application Priority Data

Mar. 19, 2019 (CN) .......................... 2019 1 0208435

(51) Int. Cl.
*G06F 3/02* (2006.01)
*F21V 8/00* (2006.01)

(52) U.S. Cl.
CPC ........... *G06F 3/0205* (2013.01); *G02B 6/005* (2013.01)

(58) Field of Classification Search
CPC ...... G06F 3/0205; G02B 6/005; H01H 13/02; H01H 13/023; H01H 13/70; H01H 13/83; H01H 9/182
See application file for complete search history.

(56) References Cited

U.S. PATENT DOCUMENTS

| 4,489,227 A * | 12/1984 | Lamarche ............ H01H 13/705 200/314 |
| 2005/0231395 A1* | 10/2005 | Shipman ............... G06F 3/0202 341/22 |
| 2007/0147731 A1* | 6/2007 | Barrowclough ......... G02B 6/10 385/18 |

(Continued)

*Primary Examiner* — Mary Ellen Bowman
(74) *Attorney, Agent, or Firm* — JCIPRNET

(57) ABSTRACT

The disclosure provides an illuminating keyboard including a joystick module and a backlight module. The joystick module includes a base portion and a joystick mounted on the base portion. The joystick has a head portion with a first diameter and a neck portion with a second diameter, and the second diameter is smaller than the first diameter. The backlight module includes a light source, a light-guide plate, and a partial opaque diaphragm disposed above the light-guide plate. The partial opaque diaphragm has a body portion, an extending segment, and a first accommodation opening. The extending segment is disposed between the first accommodation opening and the body portion. The first accommodation opening having a third diameter smaller than the first diameter is surrounded by the extending segment. When the joystick module is inserted into the first accommodation opening, an end of the extending segment is firmly attached to the joystick module.

11 Claims, 5 Drawing Sheets

(56) References Cited

U.S. PATENT DOCUMENTS

| | | | |
|---|---|---|---|
| 2009/0045986 A1* | 2/2009 | Fabrenius | G02B 6/0021 |
| | | | 341/22 |
| 2014/0168935 A1* | 6/2014 | Chen | G02B 6/0083 |
| | | | 362/23.03 |
| 2018/0040440 A1* | 2/2018 | Enomoto | H01H 13/02 |
| 2018/0122597 A1* | 5/2018 | Yen | G02B 6/0055 |

* cited by examiner

ILLUMINATING KEYBOARD

CROSS-REFERENCE TO RELATED APPLICATION

This application claims the priority benefit of U.S. provisional application Ser. No. 62/712,993, filed on Aug. 1, 2018, and China application serial no. 201910208435.8, filed on Mar. 19, 2019. The entirety of the above-mentioned patent applications are hereby incorporated by reference herein and made a part of this specification.

BACKGROUND

Technical Field

The disclosure provides an illuminating keyboard, especially, an illuminating keyboard including a joystick module.

Description of Related Art

The keyboard is an indispensable device for the user when using the computer. The user inputs a command to the computer by pressing the keys on the keyboard.

When the user uses the computer, the surrounding environment probably not beneficial for the user to clearly see the printed character on the keys. Therefore, in the current technology, a backlight module is disposed in the keyboard, so that the user is able to recognize each of the characters, and can also utilize the change of light to present different visual effects.

In order to integrate the mouse and keyboard for convenience in use, the joystick is placed at the center of the keyboard. Because of requirements in disposing the joystick, a hole needs to be formed in the keyboard so as to assemble the joystick into the hole.

However, a part of light emitted by the backlight module may leak through the hole, which causes uneven illumination of the keyboard and affects the user experience.

SUMMARY

One objective of the disclosure is to provide an illuminating keyboard capable of preventing the light leakage from the periphery of the joystick.

In order to achieve the aforementioned objective, in one embodiment of the disclosure, an illuminating keyboard is provided. The illuminating keyboard includes a joystick module and a backlight module. The joystick module includes a base portion and a joystick mounted on the base portion. The joystick has a head portion and a neck portion. The head portion has a first diameter, the neck portion has a second diameter, and the second diameter is smaller than the first diameter. The backlight module includes a light source, a light-guide plate, and a partial opaque diaphragm. The partial opaque diaphragm is disposed above the light-guide plate. The partial opaque diaphragm has a body portion, an extending segment, and a first accommodation opening. The extending segment is disposed between the first accommodation opening and the body portion, the first accommodation opening is surrounded by the extending segment. The first accommodation opening has a third diameter, and the third diameter is smaller than the first diameter. The joystick module is inserted into the first accommodation opening, and an end of the extending segment is firmly attached to the joystick module.

Preferably, the end of the extending segment is firmly attached to the neck portion or a top surface of the base portion.

Preferably, the extending segment further has more than four incisions arranged along the circumference of the first accommodation opening. The number of the incisions may be from 6 to 8.

Preferably, the incisions are equally spaced apart from each other.

Preferably, the length of the incision along the radial direction of the first accommodation opening from the end of the extending segment toward the body portion is greater than or equal to a half of the difference between the first diameter and the third diameter.

Preferably, the illuminating keyboard further includes an adhesive layer disposed on a surface facing toward the extending segment of the joystick.

Preferably, the partial opaque diaphragm is a light-shielding sheet, a reflective sheet, or a combination thereof.

Preferably, the illuminating keyboard further includes a keyboard assembly disposed on the backlight module. The keyboard assembly has a second accommodation opening, and the second accommodation opening and the first accommodation opening overlap. The joystick module is inserted into the first accommodation opening and the second accommodation opening, and the end of the extending segment is firmly attached to the joystick module.

Preferably, the keyboard assembly includes a substrate and a thin film circuit board. The substrate has a first opening, and the thin film circuit board has a second opening. The substrate is disposed between the backlight module and the thin film circuit board, and the first opening and the second opening overlap to form the second accommodation opening.

Preferably, the thin film circuit board has a plurality of notches, the notch is formed from the second opening toward the inside of the thin film circuit board along the radial direction of the second opening, and the notches and the incisions are alternately disposed from each other.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
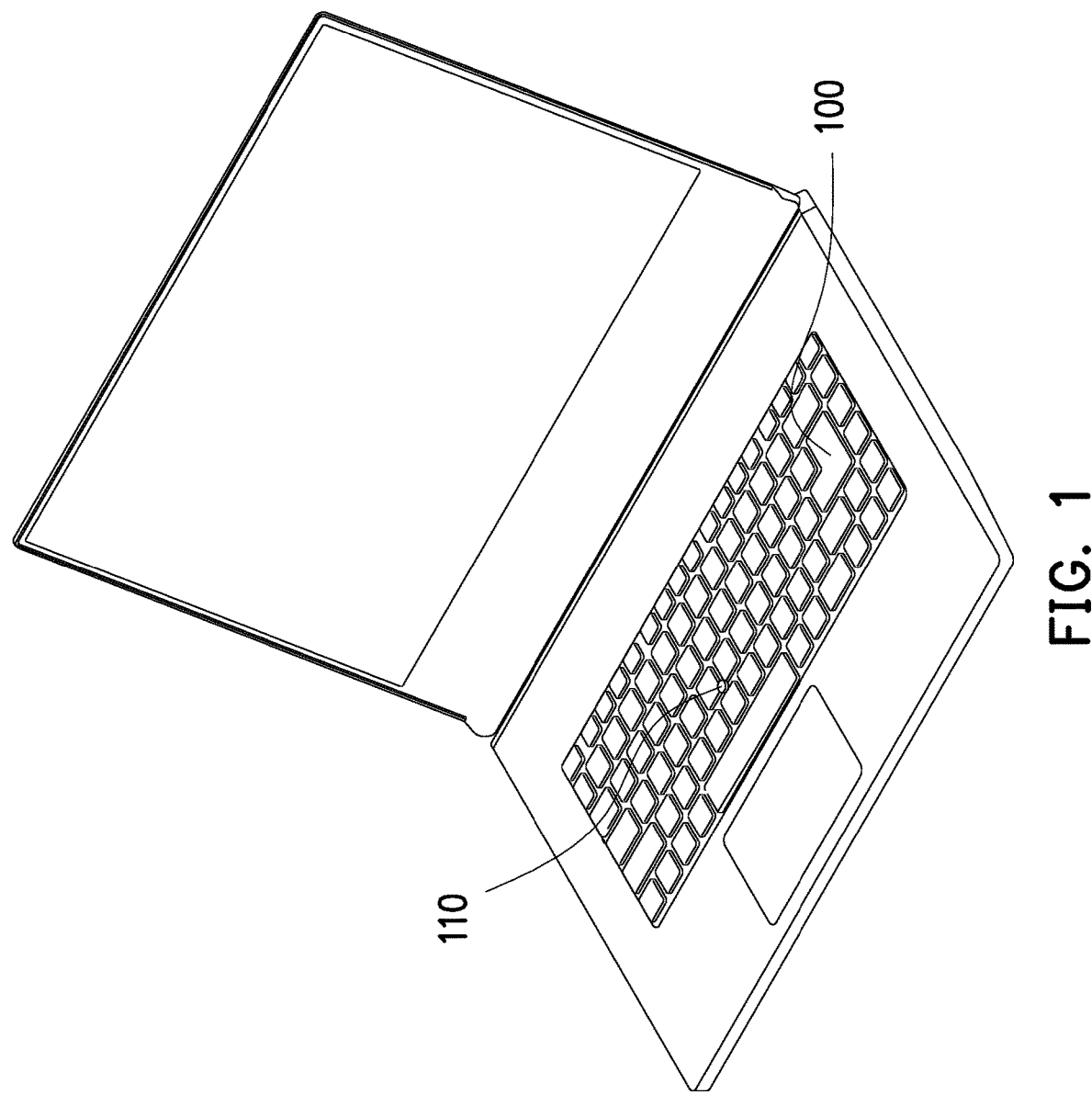
FIG. 1 is a schematic view illustrating an illuminating keyboard of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
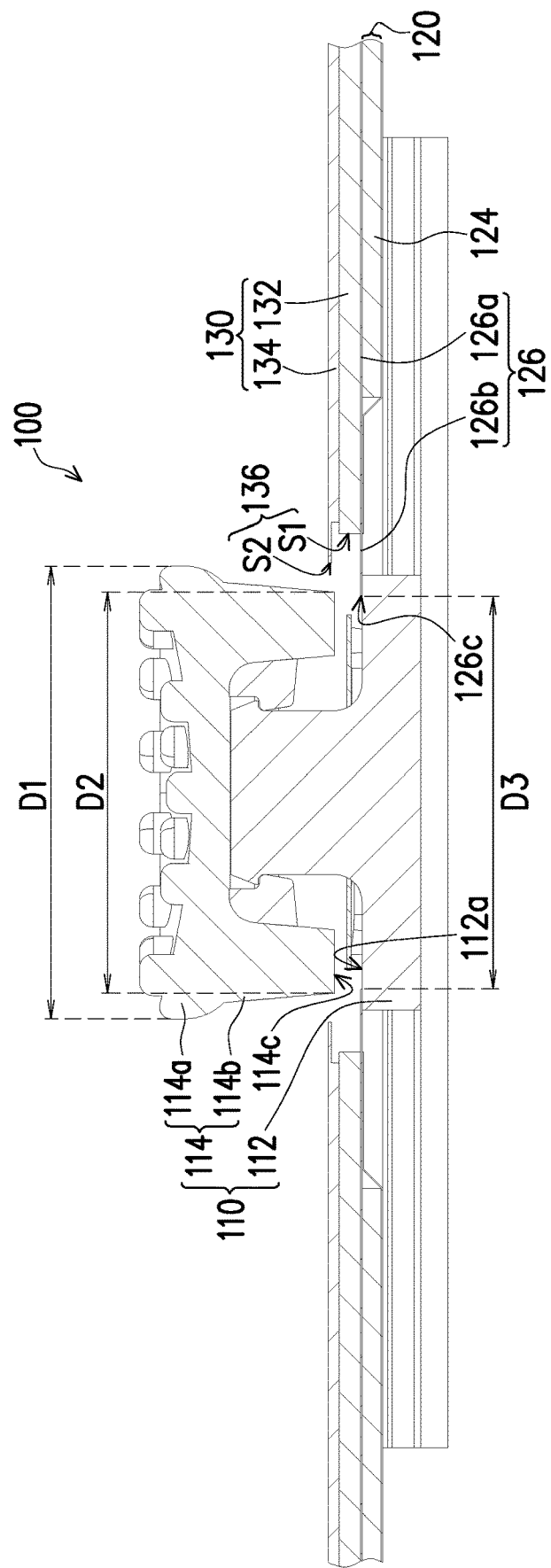
FIG. 2 is a partial cross-sectional view illustrating an illuminating keyboard of the disclosure.
Figure 3:
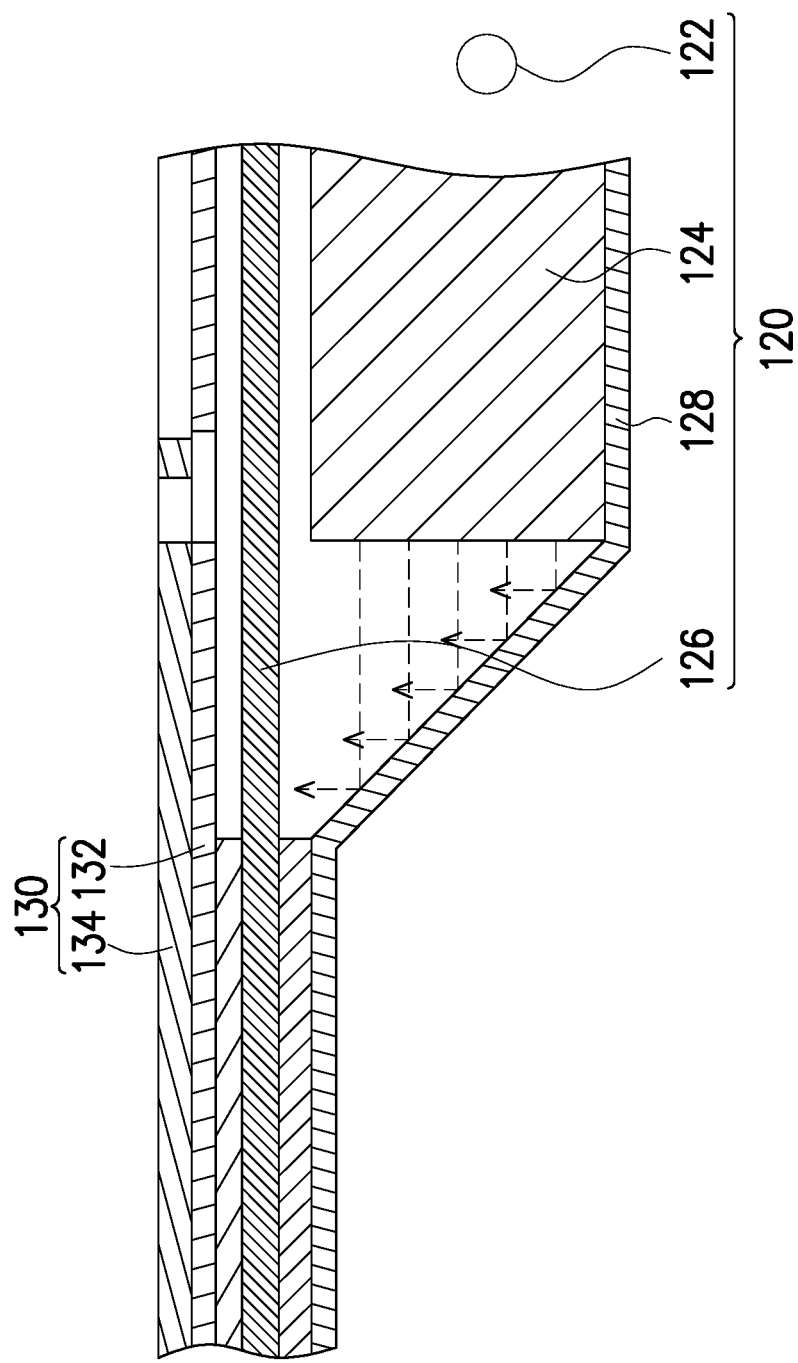
FIG. 3 is a partial cross-sectional view illustrating a backlight module of the disclosure.
Figure 4:
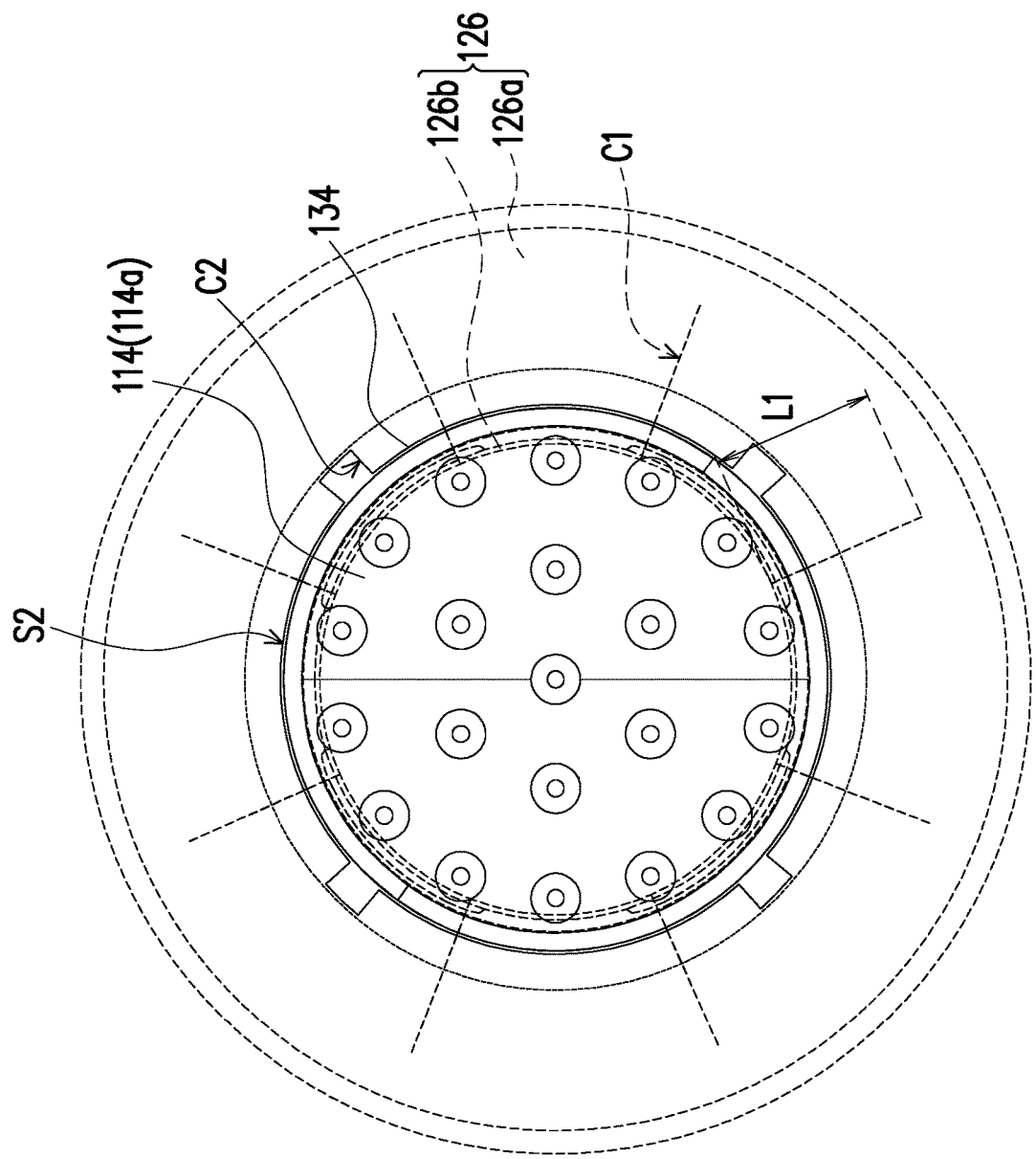
FIG. 4 is a partial top view illustrating a joystick module, a keyboard assembly, and a backlight module after being assembled of the disclosure.

FIG. 1 is a schematic view illustrating an illuminating keyboard of one embodiment of the disclosure. FIG. 2 is a partial cross-sectional view illustrating an illuminating keyboard of one embodiment of the disclosure. FIG. 3 is a partial cross-sectional view illustrating a backlight module of one embodiment of the disclosure. FIG. 4 is a partial top view illustrating a joystick module, a keyboard assembly, and a backlight module after being assembled of one embodiment of the disclosure. Referring to FIG. 1, FIG. 2, and FIG. 3 simultaneously, an illuminating keyboard 100 of the present embodiment includes a joystick module 110, a backlight module 120, and a keyboard assembly 130. The keyboard assembly 130 is stacked on the backlight module 120, and the joystick module 110 is disposed to pass through the backlight module 120 and the keyboard assembly 130.

The joystick module 110 is generally disposed at the center of the illuminating keyboard 100 for controlling the movement of the cursor. To be more specific, the joystick module 110 includes a base portion 112 and a joystick 114, and the joystick 114 is mounted on the base portion 112. The joystick 114 has a head portion 114a and a neck portion 114b. The head portion 114a has a first diameter D1, the neck portion 114b has a second diameter D2, and the second diameter D2 is smaller than the first diameter D1. The neck portion 114b may has a tapered shape from the head portion 114a toward the base portion 112, but the disclosure is not limited thereto. The second diameter D2 is the smallest diameter of the neck portion 114b having a tapered shape shown in FIG. 2.

The backlight module 120 includes a light source 122, a light-guide plate 124, and a partial opaque diaphragm 126. The backlight module 120 of the present embodiment may be a side-lighting type, and the light source 122 is disposed on a side of the light-guide plate 124. In other embodiments, the backlight module 120 may be a bottom-lighting type, the light source 122 is disposed at the bottom of the light-guide plate 124, and the light guide plate 124 may be replaced by a diffusion plate to make the backlight module 120 emit light evenly. The partial opaque diaphragm 126 is disposed between the light-guide plate 124 and the keyboard assembly 130, and the partial opaque diaphragm 126 in the present embodiment is a light-shielding sheet, a reflective sheet, or a combination thereof. The partial opaque diaphragm 126 is used to shield light so as to prevent light from being emitted from unexpected places, or to reflect light back to the inner space of the backlight module 120. When the partial opaque diaphragm 126 is a light-shielding sheet, portions of the light-shielding sheet surrounding the light-guide plate 124 and surrounding the joystick module 110, and the area that is unexpected to emit light are opaque. Otherwise, the backlight module 120 further includes a reflective plate 128 disposed below the light-guide plate 124 and edges of the reflective plate 128 are bent upward to cover the sides of the light-guide plate 124, and then the reflective plate 128 is adhered to the partial opaque diaphragm 126 above the light-guide plate 124, so as to further prevent light from leaking from the bottom and sides of the backlight module 120.

Referring to FIG. 2, FIG. 3, and FIG. 4, the partial opaque diaphragm 126 has a body portion 126a, an extending segment 126b, and a first accommodation opening 126c. The extending segment 126b is disposed between the first accommodation opening 126c and the body portion 126a, and the extending segment 126b is a portion, which protrudes from the body portion 126a to outside of the substrate 132, of the partial opaque diaphragm 126. The first accommodation opening 126c is surrounded by the extending segment 126b. The first accommodation opening 126c has the third diameter D3 that is smaller than the first diameter D1. The third diameter D3 may be smaller than the first diameter D1 and the second diameter D2, but the disclosure is not limited thereto. In other embodiments of the disclosure, the third diameter D3 may be smaller than the first diameter D1 but is greater than the second diameter D2.

The keyboard assembly 130 disposed on the backlight module 120 includes a substrate 132 and a thin film circuit board 134. The substrate 132 has the first opening S1, and the thin film circuit board 134 has the second opening S2. The diameter of the first opening S1 is greater than or equal to the diameter of the second opening S2. The substrate 132 is disposed between the backlight module 120 and the thin film circuit board 134, and the first opening S1 and the second opening S2 overlap to form the second accommodation opening 136 which overlaps with the first accommodation opening 126c. Herein, the term "overlap" means that the orthographic projections of the first opening S1 and the second opening S2 are coincident and that the orthographic projections of the first accommodation opening 126c and the second accommodation opening 136 are coincident.

The joystick module 110 is inserted into the overlapping area of the first accommodation opening 126c and the second accommodation opening 136. The diameter of the second opening S2 of the second accommodation opening 136 is greater than the third diameter D3 of the first accommodation opening 126c and is also greater than the first diameter D1 of the joystick module 110.

More specifically, the third diameter D3 of the first accommodation opening 126c is smaller than the first diameter D1 of the joystick module 110, and the extending segment 126b of the partial opaque diaphragm 126 protrudes from the substrate 132 a long distance. Therefore, when the joystick module 110 is mounted on the backlight module 120 and the keyboard assembly 130, the joystick module 110 is inserted into the overlapping area of the first accommodation opening 126c and the second accommodation opening 136. The joystick module 110 presses to move the partial opaque diaphragm 126 upwards. Since the partial opaque diaphragm 126 is deformable, the joystick module 110 can passes through the first accommodation opening 126c. After the head portion 114a of the joystick 114 of the joystick module 110 passes through the first accommodation opening 126c, the extending segment 126b is able to adapt to the shape of the neck portion 114b. Since there is a gap between a bottom surface 114c of the neck portion 114b and a top surface 112a of a bottom portion of the base portion 112, the extending segment 126b of the partial opaque diaphragm 126 slides from the neck portion 114b of the joystick 114 down to the top surface 112a of the bottom portion of the base portion 112.

It is worth mentioning that, an adhesive layer is coated on the end of the extending segment 126b of the partial opaque diaphragm 126 and/or on the top surface 112a, which is corresponding to the end of the extending segment 126b, of the bottom portion of the base portion 112. In this way, the end of the extending segment 126b that falls on the top surface 112a can be adhered to the top surface 112a of the base portion 112 via the adhesive layer.

The end of the extending segment 126b of the partial opaque diaphragm 126 is adhered to the top surface 112a of the base portion 112, in order to effectively shield the assembly gap between the backlight module and the joystick, thereby having a good anti-light leakage effect.

Referring to FIG. 4, the extending segment 126b further has a plurality of incisions C1 arranged along the circumference of the first accommodation opening 126c, and the incisions C1 are formed by cutting from the end of the extending segment 126b towards the body portion 126a along the radial direction of the first accommodation opening 126c. The incisions C1 are equally spaced apart from each other, and the length L1 of the incisions C1 along the radial direction of the first accommodation opening 126c from the end of the extending segment 126b towards the body portion 126a are greater than or equal to a half of the difference between the first diameter D1 and the third diameter D3. It is worth mentioning that, the number of the incisions C1 and the lengths of the incisions C1 are related. The greater the length of the incision C1 is, the more incisions C1 are required. Generally, the number of the incisions C1 is 4, preferably from 6 to 8.

The disposition of the incisions C1 may increase the deformability of the extending segment 126b of the partial opaque diaphragm 126, so the joystick 114 can pass through the first accommodation opening 126c more easily. It is worth mentioning that, the thin film circuit board 134 has a plurality of notches C2, the notches C2 are formed from the second opening S2 towards the inside of the thin film circuit board 134 along a radial direction of the second opening S2, and the notches C2 and the incisions C1 are alternately disposed from each other. Because the notches C2 and the incisions C1 are alternately disposed from each other, it is possible to prevent the gap generated by overlapping the notch C2 and the incision C1 and thereby preventing light leakage.

Figure 5:
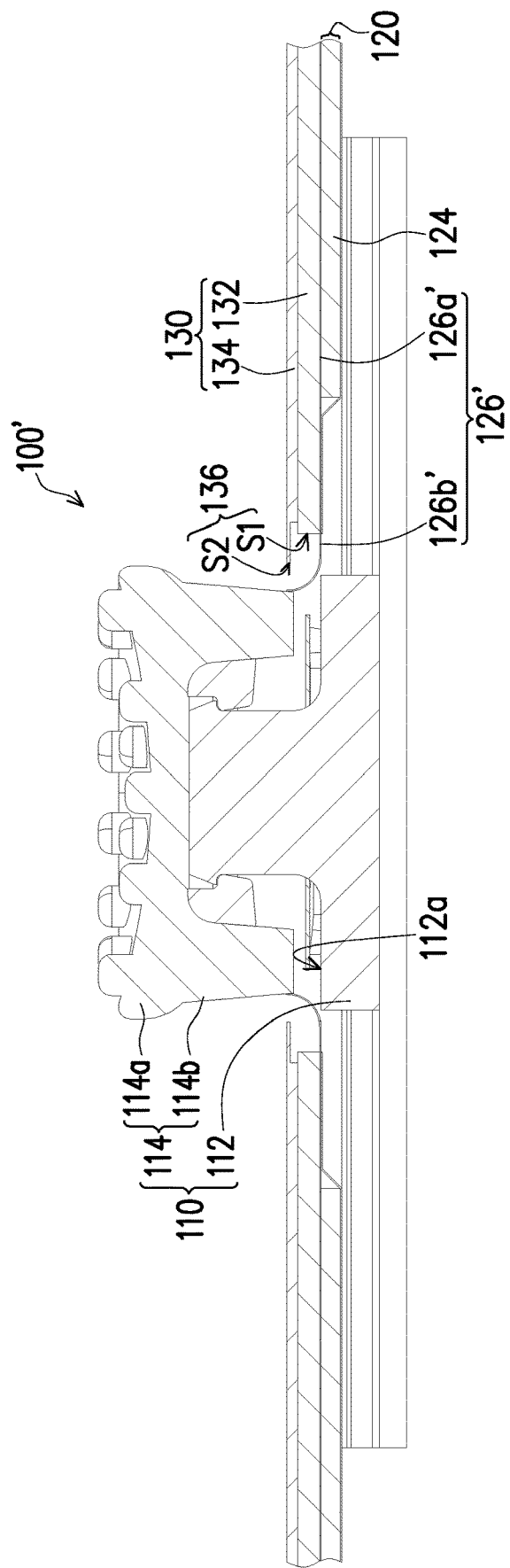
FIG. 5 is a partial schematic view illustrating an illuminating keyboard in another embodiment of the disclosure.

FIG. 5 is a partial schematic view illustrating an illuminating keyboard in another embodiment of the disclosure. The present embodiment is similar to the aforementioned embodiment, and the similarities are not repeated hereinafter. The main difference between the two embodiments is that, in the illuminating keyboard 100' of the present embodiment, after the joystick module 110, the backlight module 120, and the keyboard assembly 130 are assembled, the contact position of an extending segment 126b' of a partial opaque diaphragm 126' and the joystick module 110 is different, but still achieve the effect of prevent light leakage.

To be more specific, in the present embodiment, the extending segment 126b' of the partial opaque diaphragm 126' protruding from the body portion 126a' to the outside of the substrate 132 is longer. Therefore, after the joystick 114 passes through the partial opaque diaphragm 126' and the second accommodation opening 136, the end of the extending segment 126b' can be bent and firmly attached to the sidewall of the neck portion 114b of the joystick 114.

Similarly, an adhesive layer is coated on the end of the extending segment 126b' of the partial opaque diaphragm 126' and/or on the sidewall, which is corresponding to the end of the extending segment 126b', of the neck portion 114b of the joystick 114. In this way, the end of the extending segment 126b' that falls onto the sidewall can be adhered to the sidewall of the neck portion 114b via the adhesive layer.

As a result, the extending segment 126b' of the partial opaque diaphragm 126' shields the assembly gap between the joystick module 110 and the backlight module 120 so as to achieve the effect of preventing the light, which is emitted from the backlight module 120, from leaking from the circumference of the joystick module 110.

Based on the above, the extending segment of the partial opaque diaphragm is firmly attached to the sidewall of the neck portion of the joystick module or the top surface of the base portion of the joystick module, so as to effectively shield the gap between the backlight module and the joystick module, thereby preventing light leakage.

Furthermore, the third diameter of the first accommodation opening of the partial opaque diaphragm is smaller than the first diameter of the joystick module, so as to allow assembly tolerance and even assembly misalignment, and the gap between the backlight module and joystick module is still effectively shielded, thereby preventing light leakage.

In addition, the disposition of the incisions increases the deformability of the extending segment of the partial opaque diaphragm to adapt to the shape of the joystick module, so as allow the joystick module to be assembled to the backlight module and the keyboard assembly in a manner that the base portion and the joystick are integrated. Therefore, it is not necessary to assemble the base portion from the below of the backlight module first and then assemble the joystick to the base portion from the above of the keyboard assembly.

Otherwise, the notches and the incisions are alternately disposed from each other, so as to prevent the gap generated by overlapping the notch and the incision and thereby preventing light leakage.

Although the present disclosure and the advantages thereof have been described in detail, it should be understood that various changes, substitutions, and alternations can be made therein without departing from the spirit and scope of the disclosure as defined by the appended claims. That is, the discussion included in this disclosure is intended to serve as a basic description. It should be understood that the specific discussion may not explicitly describe all embodiments possible; many alternatives are implicit. The generic nature of the disclosure may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:
1. An illuminating keyboard, comprising:
   a joystick module, comprising:
      a base portion;
      a joystick, mounted on the base portion, the joystick having a head portion and a neck portion, the head portion having a first diameter, the neck portion having a second diameter, and the second diameter being smaller than the first diameter;
   a backlight module, comprising:
      a light source;
      a light-guide plate; and
      a partial opaque diaphragm, disposed above the light-guide plate, the partial opaque diaphragm having a body portion, an extending segment, and a first accommodation opening, wherein the extending segment is disposed between the first accommodation opening and the body portion, the first accommodation opening is surrounded by the extending segment, the first accommodation opening has a third diameter, the third diameter is smaller than the first diameter, and wherein the joystick module is inserted into the first accommodation opening, and an end of the extending segment is firmly attached to the joystick module.

2. The illuminating keyboard as claimed in claim 1, wherein the end of the extending segment is firmly attached to the neck portion or a top surface of the base portion.

3. The illuminating keyboard as claimed in claim 1, wherein the extending segment further has more than four incisions arranged along a circumference of the first accommodation opening.

4. The illuminating keyboard as claimed in claim 3, wherein a number of the incisions is from 6 to 8.

5. The illuminating keyboard as claimed in claim 3, wherein the incisions are equally spaced apart from each other.

6. The illuminating keyboard as claimed in claim 3, wherein a length of the incision along a radial direction of the first accommodation opening from the end of the extending segment toward the body portion is greater than or equal to a half of a difference between the first diameter and the third diameter.

7. The illuminating keyboard as claimed in claim 1, further comprising an adhesive layer disposed on a surface of the extending segment facing toward the joystick.

8. The illuminating keyboard as claimed in claim 1, wherein the partial opaque diaphragm is a light-shielding sheet, a reflective sheet, or a combination thereof.

9. The illuminating keyboard as claimed in claim 3, further comprising a keyboard assembly disposed on the backlight module, wherein the keyboard assembly has a second accommodation opening, the second accommodation opening and the first accommodation opening overlap, the joystick module is inserted into the first accommodation opening and the second accommodation opening, and the end of the extending segment is firmly attached to the joystick module.

10. The illuminating keyboard as claimed in claim 9, wherein the keyboard assembly comprises:

a substrate, having a first opening; and a thin film circuit board, having a second opening, wherein the substrate is disposed between the backlight module and the thin film circuit board, and the first opening and the second opening overlap to form the second accommodation opening.

11. The illuminating keyboard as claimed in claim 10, wherein the thin film circuit board has a plurality of notches, each of the notches is formed from the second opening toward an inside of the thin film circuit board along a radial direction of the second opening, and the notches and the incisions are alternately disposed from each other.

\* \* \* \* \*